United States Patent [19]

Lu et al.

[11] Patent Number: 4,737,850

[45] Date of Patent: Apr. 12, 1988

[54] APPARATUS FOR NOISE REDUCING COMPOSITE VIDEO SIGNAL

[75] Inventors: Chung H. Lu, Plainsboro, N.J.; Alfonse Acampora, Staten Island, N.Y.

[73] Assignee: RCA Corporation, Princeton, N.J.

[21] Appl. No.: 793,734

[22] Filed: Nov. 1, 1985

Related U.S. Application Data

[63] Continuation-in-part of Ser. No. 751,681, Jul. 3, 1985, abandoned.

[51] Int. Cl.⁴ .............................................. H04N 5/21
[52] U.S. Cl. ...................................... 358/167; 358/36
[58] Field of Search ...................... 358/167, 37, 36.35, 358/166, 160, 21 R, 27

[56] References Cited

U.S. PATENT DOCUMENTS

| | | | |
|---|---|---|---|
| 4,064,530 | 12/1977 | Kaiser et al. | 358/36 |
| 4,163,249 | 7/1979 | Michael et al. | 358/21 R |
| 4,240,106 | 12/1980 | Michael et al. | 358/36 |
| 4,268,855 | 5/1981 | Takahashi | 358/36 |
| 4,275,418 | 6/1981 | Trump et al. | 358/167 |
| 4,291,333 | 9/1981 | Warnock et al. | 358/36 |
| 4,296,436 | 10/1981 | Achiha | 358/167 |
| 4,361,853 | 11/1982 | Remy et al. | 358/167 |
| 4,388,729 | 6/1983 | Spencer et al. | 455/72 |
| 4,392,123 | 7/1983 | Brüggemann | 340/347 AD |
| 4,485,403 | 11/1984 | Illetschko | 358/167 |
| 4,636,841 | 1/1987 | Moles | 358/36 |
| 4,639,784 | 1/1987 | Fling | 358/167 |

FOREIGN PATENT DOCUMENTS

| | | |
|---|---|---|
| 1515551 | 6/1978 | United Kingdom . |
| 2083317 | 3/1982 | United Kingdom . |
| 2083318 | 3/1982 | United Kingdom . |
| 2157528 | 10/1985 | United Kingdom . |

OTHER PUBLICATIONS

H. Urkowitz, "Analysis and Synthesis of Delay Line Periodic Filters", IRE Trans. on Circuit Theory, Jun. 1957, pp. 41-53.

Primary Examiner—Tommy P. Chin
Attorney, Agent, or Firm—E. M. Whitacre; P. J. Rasmussen; E. P. Herrmann

[57] ABSTRACT

In field/frame recursive filters for providing noise reduction to composite video signal, inversion of the chrominance component of the composite video signal is obviated by selecting nearest neighbor in-phase field/frame delayed signals for recursion. The system arbitrates between two or more nearest neighbor in-phase signals or combinations thereof and feeds back the signal having an amplitude most closely matching the incoming composite video signal.

19 Claims, 5 Drawing Sheets

```
LINE
n+524    Y+Q   Y-I   Y-Q   (Y+I)^R   Y+Q   Y-I   Y-Q  ⎫
                   U        W         S                ⎪
n+525    Y-Q  (Y+I) Y+Q   (Y-I)   Y-Q  (Y+I) Y+Q      ⎬ FRAME J
                                                       ⎪
n+526    Y+Q   Y-I   Y-Q   (Y+I)^T   Y+Q   Y-I   Y-Q  ⎭ n-1      Y-Q   Y+I   Y+Q   (Y-I)^R'  Y-Q   Y+I   Y+Q  ⎫
                   U'       W'        S'               ⎪
n        Y+Q  (Y-I) Y-Q   (Y+I)   Y+Q  (Y-I) Y-Q      ⎬ FRAME J-1
                                                       ⎪
n+1      Y-Q   Y+I   Y+Q   (Y-I)^T'  Y-Q   Y+I   Y+Q  ⎭ n+524    Y+Q   Y-I   Y-Q    Y+I    Y+Q   Y-I   Y-Q    ⎫
n+262    Y+Q  (Y-I)(Y-Q)(Y+I)  (Y+Q)(Y-I) Y-Q         ⎪
              C    D    E      F    G                  ⎪
n+525    Y-Q   Y+I   Y+Q   (Y-I)   Y-Q   Y+I   Y+Q    ⎬ FIELD M &
                              W                        ⎪ FIELD M+1
n+263    Y-Q   Y+I   Y+Q   (Y-I)   Y-Q   Y+I   Y+Q    ⎪
                              P                        ⎪
n+526    Y+Q   Y-I   Y-Q    Y+I    Y+Q   Y-I   Y-Q    ⎭
```

*Fig. 2*

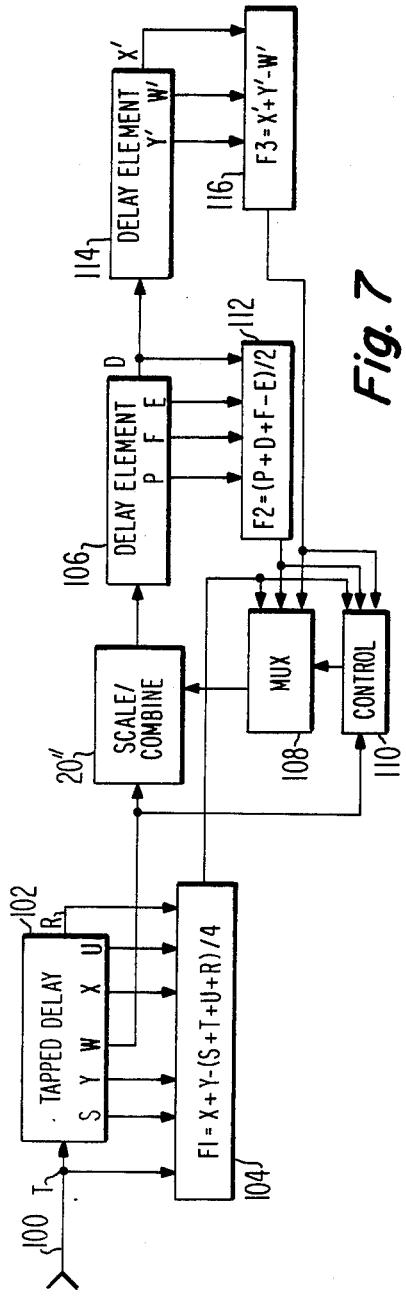
Fig. 7
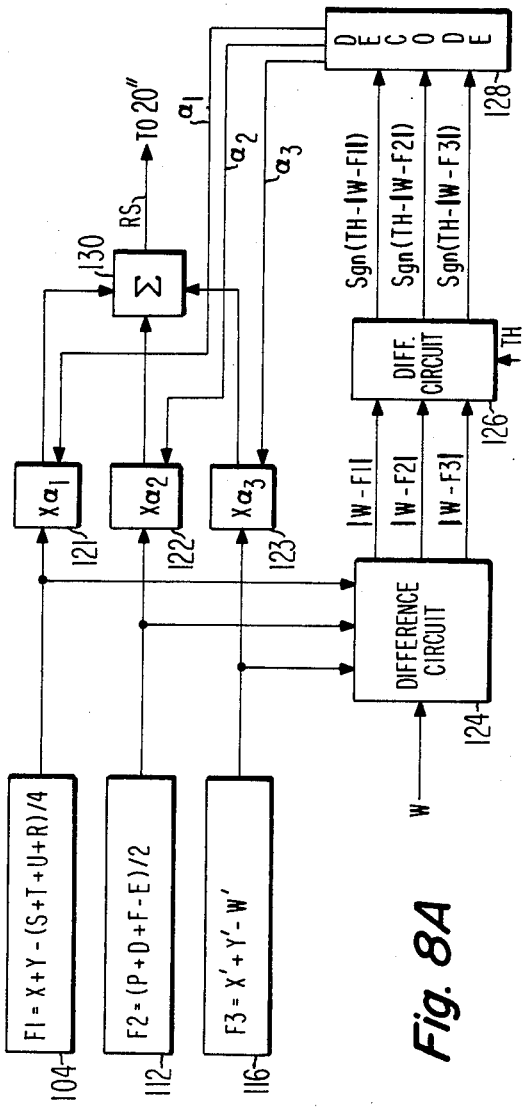
Fig. 8A
Fig. 8B

APPARATUS FOR NOISE REDUCING COMPOSITE VIDEO SIGNAL

This is a continuation-in-part of application Ser. No. 751,681, filed July 3, 1985 now abandoned.

This invention relates to circuitry for performing noise reduction of video signals using recursive filtering techniques.

BACKGROUND OF THE INVENTION

Recursive filter arrangements are known wherein incoming television signals are proportioned and added to weighted signals from previous frames of television signals that were proportioned in like manner. Recursive filtering may be performed on component video signals, i.e. luminance and color difference signals, or chrominance or on composite video signals. If recursive filtering is performed on component signals, significantly more memory or storage devices is required over a system which recursively filters composite video signal. However, if composite video is to be recursively filtered, e.g. using one frame of delay, the chrominance component of the composite video signal must be phase inverted since the chrominance component is 180° out of phase from frame-to-frame (NTSC). Heretofore, chrominance phase inversion has required separation of the luminance and chrominance components, inversion of the chrominance component and recombination of the luminance and inverted chrominance component. It is an object of the present invention to provide simplified chrominance phase inverting circuitry for composite video recursive filter systems.

SUMMARY OF THE INVENTION

The recursive filter of the present invention includes circuitry for proportioning and combining incoming signal and signal from delayed image segments which has been previously processed by the proportioning and combining circuitry. A delay element is coupled to the output of the proportioning and combining circuitry to provide signal delays of substantially integral image intervals. Nearest neighbor signals samples delayed slightly more or less than exactly one image interval, that have a chrominance component in phase with incoming composite video signal, are fed back from the delay element to the proportioning and combining circuit.

BRIEF DESCRIPTION OF THE DRAWINGS

FIG. 2 shows two dimensional arrays of a portion of signal samples from the successive frames of composite video and the superposition of samples from two successive fields of interlaced composite video signal.

FIGS. 3, 5, 6 and 7 are block diagrams of video recursive filters embodying the present invention.

FIG. 8A is a block diagram of arbitration circuitry for selecting one of several signals for application in the recursion algorithm.

FIG. 8B is a table of codewords used by the circuitry of FIG. 8A.

DETAILED DESCRIPTION

The invention may be practiced on either analog or digital signals with the appropriate choice of hardware. The individual hardware elements, i.e. adders, scalers, memories, etc. are of conventional design. One assumption is made, and that is that the signal is in sampled data format for both analog and digital signals. The samples operated on are phase locked to the color subcarrier and, for convenience of the description that follows, taken at four times the subcarrier frequency. Samples are presumed to be taken along the I and Q color difference signal phase axes so that the samples occur in the sequence $(Y-Q)_{n-1}$, $(Y+I)_n$, $(Y+Q)_n$, $(Y-I)_n$, $(Y-Q)_n$, $(Y+I)_{n+1}$, etc. where Y represents the luminance component of composite video signal and I and Q represent the color difference contributions of the chrominance component of composite video and the subscripts denote successive cycles of the color subcarrier.

In the NTSC signal format the chrominance component is 180° out of phase line-to-line within a field and is also 180° out of phase from frame-to-frame.

Figure 1:
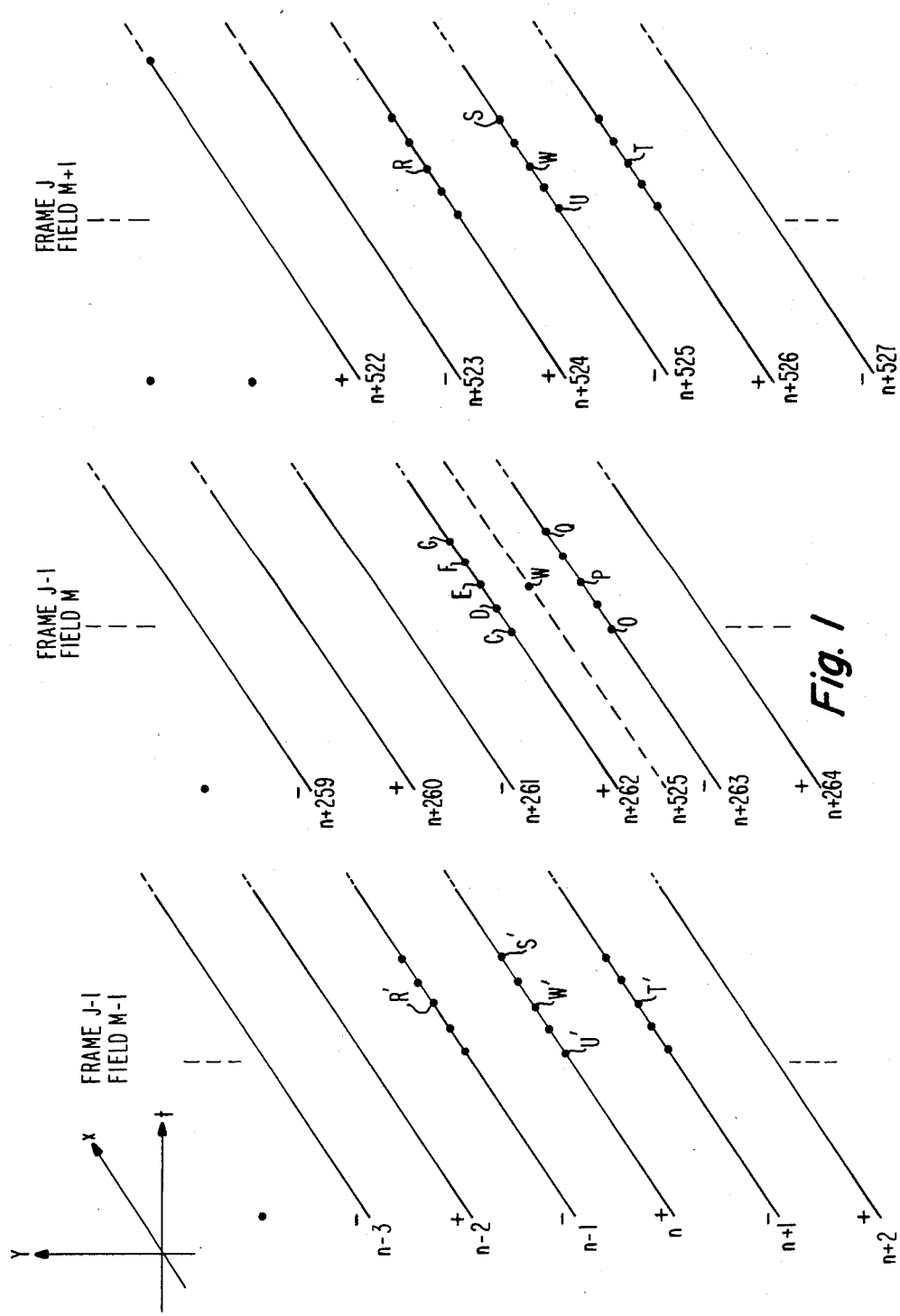
FIG. 1 is a diagrammatic representation of interlaced video signals in three dimensions.

Referring to FIG. 1, portions of three fields of composite video signal are illustrated diagrammatically in a three dimensional representation. The x and y axes represent the video signals which contribute to the horizontal and vertical dimensions of a reproduced image. The t axis represents time or the field sequence of the displayed image. The lines parallel to the x axis and numbered n+i represent horizontal lines of information as displayed. The + or − sign represents the relative phase of the color subcarrier for the particular line. Lines n−3 to n+2 correspond to a portion of the lines from field M−1 of frame J−1. Lines n+522 to n+527 are the corresponding horizontal lines in frame J. Frame J is the current frame and frame J−1 the immediately preceding frame. The dots on particular lines represent signal samples corresponding to picture elements (pixels). Successive samples along a particular line occur at 90° phase intervals relative to the color subcarrier. Points R, S, T, U and W in field M−1 correspond to the pixels R', S', T', U' and W' of field M−1 and are separated by one frame interval. The chrominance phase of points R, S, T, U and W are antiphase with points R', S', T', U' and W' respectively. The phase relationship is illustrated in FIG. 2.

In FIG. 2, samples from portions of three lines from frame J and corresponding samples from frame J−1 are shown. The samples each include a luminance component Y and a color difference component I or Q. The ± signs indicate the sampling phase and not signal polarity. The sampling phase of a +I (+Q) sample is 180° from the sampling phase of a −I (−Q) sample. In FIG. 2, the exemplary samples R, S, T, U and W from frame J are circled and labelled. Similarly, the samples R', S', T', U' and W' from frame J−1 are circled and labelled. The antiphase chrominance of corresponding pixels from frame-to-frame is evident.

Consider sample W. Conventional video recursive filters combine a fraction of sample W with a complementary fraction of sample W' (assuming frame J−1 has been previously subjected to recursive filtering). Unless the chrominance phase (i.e. the I phase) of either sample W or W' is inverted, the I component will be partially cancelled. Thus, the necessity of a chrominance inversion circuit.

Examining samples from frame J−1 in FIG. 2 reveals that the samples R', S', T' and U' all contain the same chrominance phase as sample W from frame J. Any of these samples may be recursively combined with sample W without requiring chrominance phase inversion. The question that immediately arises is, will such an arrangement produce a like response as the conventional composite video recursive filter. Experiments have shown the answer to be yes. The principles of video recursive filtering for in-band noise reduction depend upon corresponding samples from successive frames representing the same or coherent image information, and that the noise introduced in the signal be random for corresponding samples. It is known that video signals contain a large percentage of redundant information. Vertically aligned samples on successive lines will contain like information a large percentage of time. If the information in sample W' is the same as the information in sample W, then it is highly probable that the information of sample R' or T' will be the same as sample W. Therefore, sample R' or T' can be substituted for sample W' without affecting the noise reducing performance of the recursive filter.

Similarly there is a high probability that the scene information in at least one of the samples U' or S' will be the same as the scene information of sample W'. Thus, sample U' or S' may be substituted for sample W' in the recursion process without deleterious effect on the noise reduction.

One embodiment of this invention operates on these principles. Samples R' and T' and/or S' and U' are separately compared with sample W from the current frame. The sample R', T' and/or S', U' having an amplitude value closest to the amplitude value of sample W is used in the recursion process in place of sample W'. The apparatus to perform this function will be described hereinafter with reference to FIG. 3.

A second embodiment of the invention utilizes similar principles but requires only one field of signal storage rather than a full frame. Refer to FIG. 1 and in particular to the lines designated field M. In the drawing, line n+525 from field M+1 has been translated into field M in the position at which it is displayed. The pixel W on line n+525 is spatially displaced from pixels P and E on lines n+262 and n+263 respectivley by half the spatial distance it is displaced from pixels R and T on lines n+524 and n+526 (or R' and T' on lines n−1 and n+1). Because of this lesser spacing it is more probable that pixels P and E contain similar information to pixel W than pixels R' and T'. In addition, because samples P and E are closer in time to pixel W than pixels R' and T', it is more probable that pixels P and E will have been subjected to less scene motion relative to pixel W than pixels R' and T'. Therefore, a recursive filter operating on field delayed signals, e.g. pixels P and E, should provide at least as good noise reduction properties as a frame recursive filter which utilizes frame delayed substitute pixels, e.g. R' and T'.

Experiments have shown that a field recursive filter which operates on samples delayed by one field plus one-half line, (263 lines for NTSC signal) does in fact provide significant noise reduction. Sample E cannot be used directly in this manner because it does not have the appropriate chrominance phase. This may be seen in FIG. 2 in the sample array designated Field M plus Field M+1. This array is the superposition of portions of two successive fields as they would be displayed by interlaced scanning. Alternate lines are from field M+1 and intervening lines from field M. Pixel P in line n+263 is seen to be vertically aligned and in phase with pixel W in line n+525. The closest samples in line n+262 which are in phase with sample W are samples C and G. In a further embodiment of the invention samples C and G are averaged together to provide a pixel for recursion. The averaged sample and sample P are both compared to the current sample W. The averaged sample or sample P having an amplitude most similar to sample W is used in the recursion process.

A still further embodiment generates a sample for recursion from samples D, E and F. Samples D and F are summed to substantially cancel the chrominance component. Note both samples are taken within one cycle of the color subcarrier, thus, the chrominance information in both samples must be substantially identical. Sample E is subtracted from the sum of samples D and F to yield the desired sample. This process is made clear by the following equations.

$$(Y-Q)_D + (Y+Q)_F = 2Y \tag{1}$$

$$2Y - (Y+I)_E = (Y-I) \tag{2}$$

The apparatus to perform these latter embodiments will be described hereinafter with reference to FIG. 5.

Figure 6:
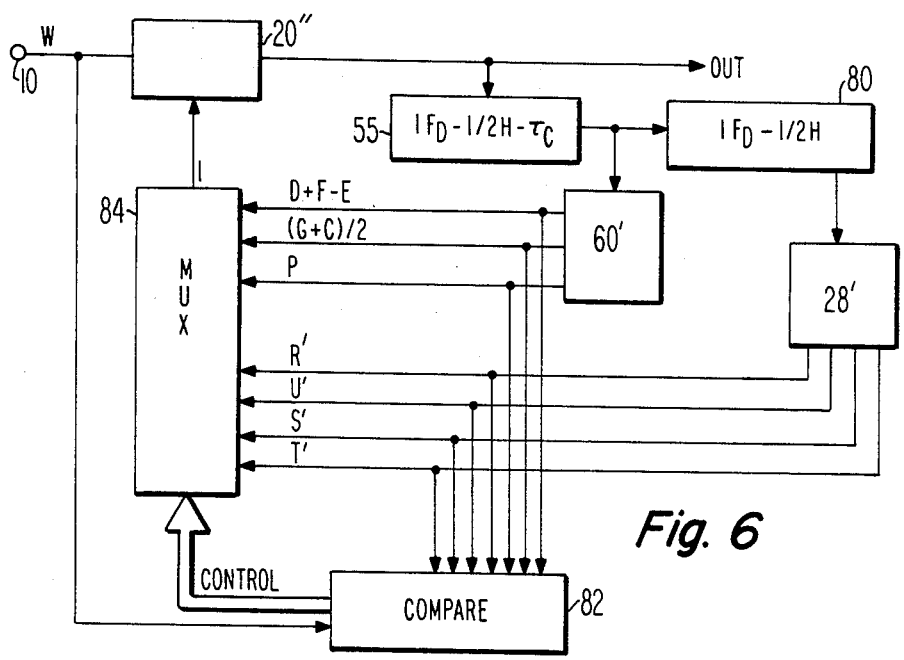

One further embodiment is the combination of one or more of the latter described embodiments with the first mentioned embodiment. This embodiment is illustrated in FIG. 6.

Figure 3:
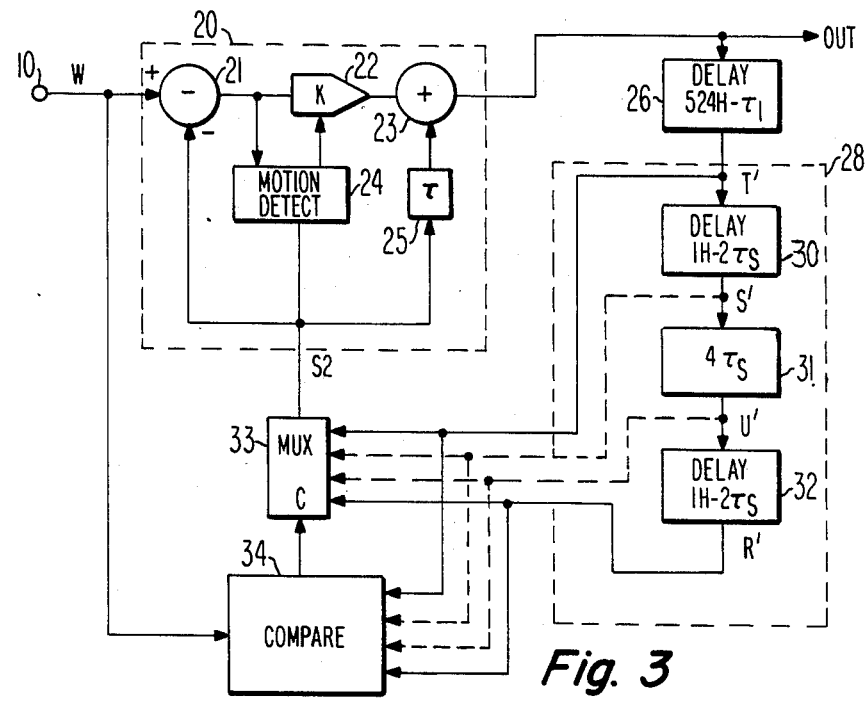

FIG. 3 is a frame recursive filter circuit for practicing the first embodiment of the invention. In the figure, letters adjacent circuit connections correspond to signal samples designated in FIGS. 1 and 2. The FIGS. 3, 5 and 6 circuits are arranged to process NTSC signals. However, it will be appreciated by those skilled in the art that the invention is applicable to PAL signal processing with the appropriate selection of delay stages. For example, a PAL embodiment of the FIG. 3 circuitry requires two PAL frames of memory rather than a single NTSC frame of memory for NTSC signal processing.

Baseband composite video signal is applied to terminal 10, from, for example, the tuner-IF section of a television receiver. this signal (W) is coupled to one input of a known recursive filter signal/combining circuit 20. Delayed signal S$_2$ from multiplexer 33 is coupled to a second input of circuit 20. The output signal, OUT, from circuit 20 may be represented by the equation:

$$OUT = KW + (1-K)S_2$$

where K is a scaling factor and W and S$_2$ are the amplitudes of the input signal W and the delayed signal S$_2$ respectively. A detailed description of this circuitry may be found in U.S. Pat. No. 4,240,106. Circuitry 20 also includes optional motion detection circuitry 24 which changes the value of the scaling factor K as a function of the difference in magnitudes of signals W and S$_2$.

The output signal from circuit 20 is coupled to the input of delay element 26. Delay element 26 delays the signal, OUT, by one video frame interval less one line interval and less a small interval τ1. The delay interval τ1 is equal to the delay incurred by delayed signal S$_2$ in coursing through multiplexer 33 and scaling/combining circuit 20. In other words, element 26 is selected to provide a signal delay, such that signal T' coupled from the output of delay element 26 to the point S$_2$, via multiplexer 33, will be delayed by exactly one frame less one horizontal line interval with respect to input signal W.

The output from delay element 26 is coupled to a tapped delay line 28. Line 28 consists of the cascade connection of delay elements 30, 31 and 32. Delay element 30 provides a delay interval of one horizontal line less two sample periods. Delay element 31 provides a delay interval of four sample periods and delay element 32 provides a delay interval of one horizontal line period less two sample periods. The total delay interval provided by the tapped delay line 28 is two horizontal line intervals. The signal available at the output of delay element 26 (and input of delay element 28) corresponds to the sample T' illustrated in FIGS. 1 and 2. The sample R' which occurred exactly two horizontal lines before sample T' is concurrently available at the output of delay element 32. The sample S' which occurred one horizontal line less two sample periods before sample T' is concurrently available at the output of delay element 30, and sample U' which occurred four sample periods before sample S' is concurrently available at the output of delay element 31.

Samples R' and T' and, if desired, samples S' and U' are coupled to respective signal input terminals of multiplexer 33. Multiplexer 33 responsive to a control signal from comparator circuit 34 selectively applies one of samples R' and T' (or samples R', T', S' and U') as signal $S_2$ to the scaling/combining circuit 20.

Delayed samples R', T', S', U' and input samples W are applied to respective input terminals of comparator circuit 34. Circuit 34 compares each of the delayed samples R', T', S', U' to the input samples W to determine which of the delayed samples has the amplitude value closest to the amplitude value of sample W. Responsive to this determination, comparator circuit 34 develops the control signal that is applied to multiplexer 33.

Figure 4:
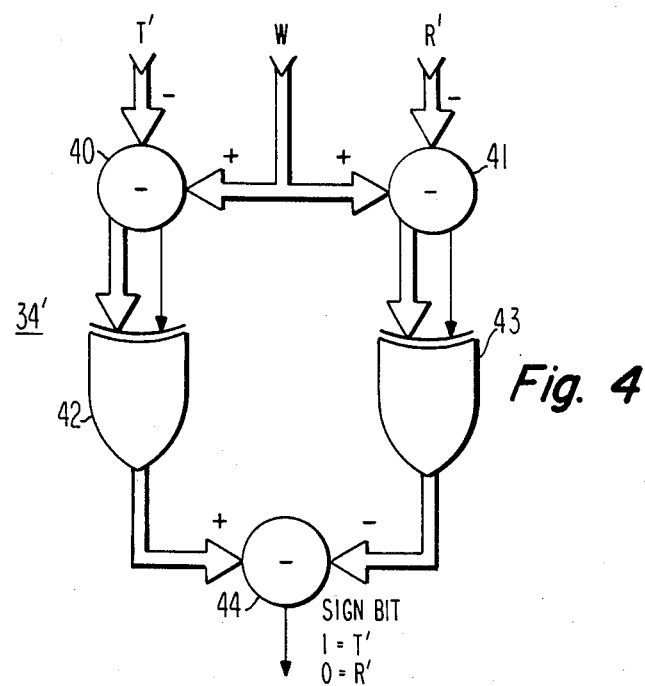
FIG. 4 is a logic diagram of comparison circuitry which may be substituted in the FIG. 3 recursive filter.

FIG. 4 is exemplary comparator circuitry 34' which may be used in a binary signal implementation of the recursive filter of FIG. 3. The samples are presumed to be in parallel-bit two's complement format. Comparator circuit 34' includes two subtracter circuits 40 and 41 to which input samples W are applied as minuends. Samples T' and R' are applied as subtrahends to subtracters 40 and 41 respectively. The output of subtracter 40 is the difference (W−T') and the output of subtracter 41 is the difference (W−R'). The output of subtracter 40 is applied to a magnitude detector 42 and the output of subtracter 41 is applied to a magnitude detector 43. Magnitude detectors 42 and 43 are exclusive OR gate circuits which are responsive to the respective sign bits of the differences to one's complement the negative difference values. This causes all of the sample differences from both subtracters 40 and 41 to have a single polarity. (For greater accuracy it may be desirable to substitute the polarity selective one's complementing exclusive OR circuits 42 and 43 with polarity selective two's complementing circuits.)

The outputs of exclusive OR's 42 and 43 are coupled to subtracter 44 as minuend and subtrahend input signals. Only the sign bit is required from subtracter 44 if the system is only to use either sample R' or T'. The output of exclusive OR circuits 42 and 43 are |W−T'| and |W−R'| respectively. The output of subtracter 44 is |W−T'|−|W−R'|. If |W−T'| is greater than |W−R'| the difference is positive and the subtracter sign bit is a zero. Thus, a zero sign bit output is indicative of the amplitude of sample R' being closer to the amplitude of W. conversely, a "one" sign bit output indicates that sample T' has the amplitude closer to sample W. In this example, the sign bit output from subtracter 44 is the control signal.

If it is desired to select between, e.g., the four samples R', T', U' and S' on a similar basis, the circuit of FIG. 4 can readily be expanded to accommodate the four samples.

Figure 5:
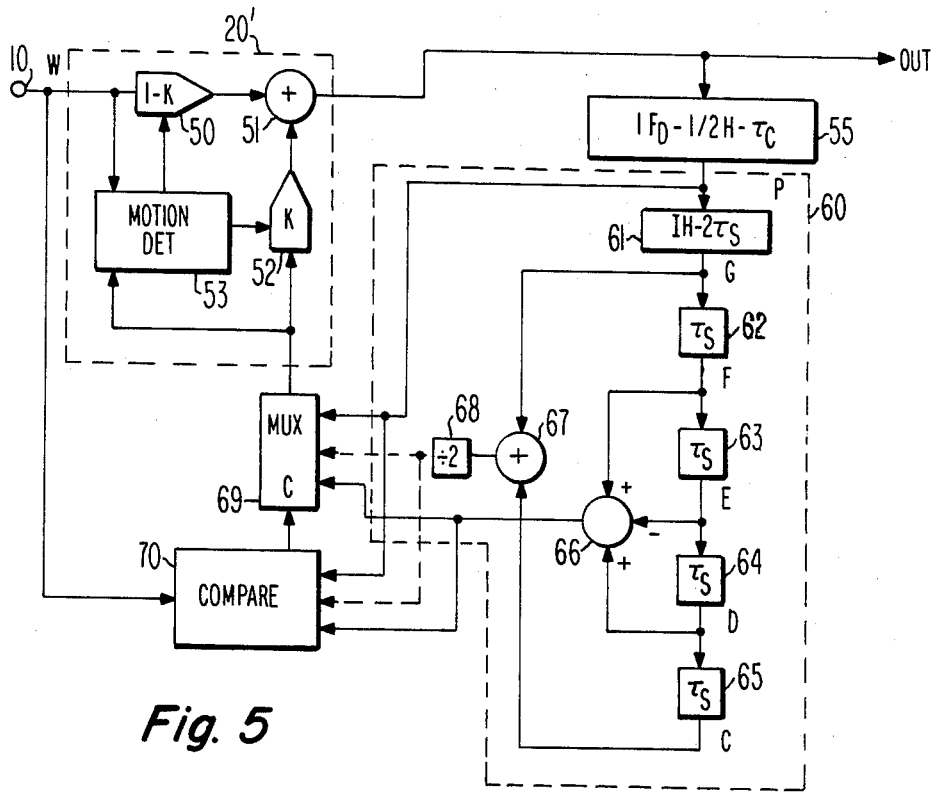

FIG. 5 illustrates field composite video recursive filter circuitry including at least four delayed signal feedback options. In FIG. 5, incoming baseband composite video signal applied at terminal 10 is coupled to one input of a known signal scaling/combining circuit 20'. Delayed signal $S_3$ from multiplexer 69 is coupled to a second input of circuit 20', which develops an output signal (OUT) given by:

$$OUT = (1-K)W + KS_3$$

where K is a scaling factor and W and $S_3$ are the amplitudes of the incoming and delayed signals respectively. A detailed description of this signal scaling/combining circuit 20' may be found in U.S. Pat. No. 4,240,106. Circuit 20' also includes an optional motion detector 53 for varying the scale factor K as a function of the amplitude differences between signals W and $S_3$.

The output signal OUT is applied to the input terminal of delay element 55. Delay element 55 delays signal applied thereto by one field interval less one-half of one horizontal line (i.e. 262 lines for NTSC) and less a small delay interval $\tau C$. The delay interval $\tau C$ compensates for the processing delays of circuit 20' and multiplexer 69. In other words, the delay period provided by delay element 55 is selected so that signal coupled from the output of delay element 55 to the second input of circuit 20' via multiplexer 69 is delayed by exactly one field less one horizontal line period relative to the incoming sample W with which it is combined in circuit 20'.

The output of delay element 55 is coupled to the input of circuitry 60 which provides several alternative delayed signals to multiplexer 69. Circuitry 60 consists of a tapped delay line including the cascade connection of delay elements 61–65, and signal combining means 67 and 66. Delay element 61 provides a signal delay interval of one horizontal line interval less two sample periods. Delay elements 62–65 each provide a signal delay interval of one sample period. The respective outputs of delay element 55 and delay elements 61–65 concurrently provide samples corresponding to samples P, G, F, E, D and C illustrated in FIGS. 1 and 2.

In a first optional embodiment, signal P from the output of delay element 55 may be coupled continuously to the signal scaling/combining circuitry 20'.

In a second optional embodiment, signal samples G and C from the outputs of delay elements 61 and 65 are summed in combining circuit 67. The output signal from combining circuit 67 is applied to a divide-by-two circuit 68 which develops a signal corresponding to the average of signals G and C. In this option, the signal from divide-by-two circuit 68 is applied continuously to the second input of signal scaling/combining circuit 20'.

In a third optional embodiment, signals F, E and D are applied to combining circuit 66 which develops the signal (D+F−E). In this option the signal from the output of combining circuit 66 is applied continuously to the second input of signal scaling/combining circuit 20'.

In a fourth and preferred optional embodiment, signal P from the output of delay element 55 and the signal (D+F−E) from combining circuit 66 are selectively coupled to the second input of signal scaling/combining circuit 20′ by multiplexer 69. Signals P and (D+F−E) are applied to signal input terminals of multiplexer 69 and to input terminals of comparator circuit 70. Incoming signal from input terminal 10 is also applied to comparator circuit 70. Responsive to the signals P, (D+F−E) and W, comparator circuit 70 develops a control signal which indicates which signal, P or (D+F−E) has an amplitude closer to the amplitude of signal W. This control signal is coupled to the control input C of multiplexer 69 to couple the appropriate signal to circuit 20′.

In a further embodiment, the three signals P, (D+F−E) and the average of G and C are tested in comparator circuit 70 and selectively coupled to circuit 20′ by multiplexer 69 according to which signal has an amplitude closest to the amplitude of signal W.

FIG. 6 illustrates circuitry which combines the embodiments of FIGS. 3 and 5. In the figure, incoming baseband composite video signal applied at input terminal 10 is coupled to a signal scaling/combining circuit 20″ which may be similar to circuit 20 or circuit 20′. The output of circuit 20″ is coupled to a delay element 55 similar to the delay element 55 in FIG. 5. The output of delay element 55 is coupled to circuitry 60′ which may be similar to circuitry 60 of FIG. 5. Circuit 60′ provides output signals P, (D+F−E) and (G+C)/2, which are applied to respective signal input terminals of multiplexer 84 and to respective input terminals of comparator circuit 82. Output signal from delay element 55 is also applied to the input terminal of a delay element 80 which delays signal by one field interval less one-half of one horizontal line period. The total signal delay provided by the cascade connection of delay elements 55 and 80 is equal to the delay provided by delay element 26 in FIG. 3.

The output of delay element 80 is coupled to a tapped delay line 28′ which may be similar to the tapped delay line 28 in FIG. 3. Tapped delay line 28′ provides the output signals R′, U′, S′ and T′ which are coupled to respective signal input terminals of multiplexer 84 and to respective input terminals of comparator 82. The input signal, W, is also coupled to a signal input terminal of comparator 82 which develops a control signal indicative of which of the signals applied to its input has an amplitude closest to the amplitude of the input signal W. Responsive to the control signal, multiplexer 84 selectively couples the appropriate delayed signal to a second input terminal of signal scaling/combining circuit 20″ for recursion.

In FIG. 6, all of the discussed signals are shown coupled to the multiplexer 84 and comparator circuit 82. It should be understood, however, that in a particular application, less than all of the illustrated signals may be coupled to the multiplexer.

Image changes occur wherein the differences between the alternate delayed signals and the current signal are all relatively large. Under these conditions, feeding back any of the alternate samples may deleteriously affect the resulting image. In addition, it has been determined that if the signal conditions are such that a particular signal (such as the frame delayed signals T′ or R′) is repeatedly selected for recursion, subdued undesirable comet tails are introduced into the image. These artifacts give the appearance of correlated noise. The latter effect may be cured by requiring that each of the alternate signals used for recursion be developed from samples substantially symmetrically disposed spatially about the corresponding delayed picture point. Desirably, the symmetry should be in both the horizontal and vertical dimensions. However, substantial vertical symmetry is the more important condition. The former problem is ameliorated by providing a further alternate signal for recursion which is developed from the current image field.

Refer to FIGS. 1 and 2. Let the picture points between U′ and W′ and between W′ and S′ be designated X′ and Y′ respectively. Similarly designate the corresponding picture points between U, W and S in frame J, as X and Y. The picture points R, U, X, Y, S and T of the current frame J correspond to samples (Y+I), (Y+I), (Y+Q), (Y−Q), (Y+I) and (Y+I) respectively. Summing the X and Y samples, i.e. (Y+Q) and (Y−Q) produces a luminance sample of twice amplitude (2Y) assuming the magntitudes of the ±Q component are equal. Summing the samples corresponding to points R, S, T and U yields 4(Y+I). If this value is divided by four and subtracted from the sum of signals from points X and Y the result is (Y−I). The amplitude of the luminance component of the result tends toward the weighted mean of the amplitudes of the luminance component of the six samples, and the phase of the chrominance component tends to correspond to the phase of the chrominance component of the current sample, W. The signal $$F1 = (X + Y - \tfrac{1}{4}(R + S + U + T)) \quad (3)$$

where X, Y, R, S, U and T correspond to the values of the designated samples, being produced from samples from the same field and which are symmetrically disposed about the current sample W, will have a magnitude similar to sample W, and thus is suitable for use in the recursion algorithm when the amplitudes of the alternate frame and field signals diverge significantly from the amplitude of the current sample. Unfortunately, averaging over five samples in the horizontal direction tends to limit horizontal bandwidth. Therefore, signal F1 is employed in the recursion algorithm on a relatively limited basis. For example, if signal F1 is made available as one of the alternate recursion signals in the FIG. 3 apparatus, i.e. F1 is coupled to multiplexer 33 and comparator circuit 34, the difference (W−F1) developed for arbitrating between the respective alternate signals may be weighted to favor the other alternate signals.

The condition of substantial vertical symmetry of the delayed signals may be realized by developing the alternate recursion signals from a number of samples. For example, a field delayed recursion signal may be developed from samples D, E, F and P which form a triangle about sample W. This signal, F2, may be derived from $$F2 = (P + D + F - E)/2 \quad (4)$$

where P, D, E and F are the amplitude values of samples P, D, E and F.

A frame delayed recursion signal, F3, may be derived from samples W′, X′ and Y′, i.e.

$$F3 = X' + Y' - W' \quad (5)$$

where X', Y' and W' are the amplitude values of samples X', Y' and W' respectively. The signal F3 is vertically symmetric about point W' since each of the contributing samples are from the same line as point W' and disposed horizontally thereabout. An alternate frame delayed signal may be derived by averaging points R' and T'.

From FIG. 2

$$F2 = [(y-I) + (Y-Q) + (Y+Q) - (Y+I)]/2 = (Y-I) \tag{6}$$

and $$F3 = (Y-Q) + (Y+Q) - (Y+I) = (Y-I). \tag{7}$$

It can be seen from equations (6) and (7) that the chrominance components of both of the signals F2 and F3 are of like phase as the current sample W and thus are suitable for recursion.

Circuitry to incorporate there features in a composite video signal recursive filter is illustrated in FIG. 7. In FIG. 7, incoming composite video signal is applied to a delay element 102 having output taps for providing delayed signals S, Y, W, X, U and R. The incoming signal, which, relative to the tapped output signals corresponds to signal T, and the signals S, Y, X, U and R are coupled to the arithmetic circuit 104. Arithmetic circuit 104 combines the signals applied thereto to develop signal F1 according to equation (3).

The tapped output signal W is coupled to one input terminal of circuit element 20" which may be similar to circuits 20 and 20' in FIGS. 3 and 5 respectively. Circuit 20" scales and combines signal W and the selected recursion signal in predetermined proportions to produce a noise reduced composite video signal. The output of circuit 20" is coupled to the delay element 106 which provides, at respective taps, the field delayed signals P, F, E and D. These field delayed signals are coupled to respective input terminals of the arithmetic circuit 112. Circuit 112 combines the signals P, F, E and D to form signal F2 according to equation (4).

The delayed signal D is also coupled to a further delay element 114. Delay element 114 delays signals by approximatey a further field period to provide the frame delayed signals X', Y' and W' at respective output taps. The signals X', Y' and W' are coupled to the arithmetic circuit 116 which combines these signals to form signal F3 according to equation (5).

The signals F1, F2 and F3 produced by arithmetic circuits 104, 112 and 116 are coupled to the multiplexer 108 and to the control circuit 110. In addition, the signal W from delay element 102 is coupled to the control circuit 110. Control element 110 develops a control signal that is coupled to multiplexer 108 and controls which of signals F1, F2 and F3 are applied to circuit 20".

Control circuit 110 may be similar to the comparator circuit 34 described with reference to FIG. 3. Generally control circuit 110 should tend to favor signal F3 over signals F2 and F1, and signal F2 over signal F1 because the order of most-to-least signal correlation with the current signal W (at least for still pictures) and because the order of widest to narrowest bandwidth recursion signals is F3, F2, F1. This priority may be achieved by weighting the signal differences $|W-Fi|$ before making the comparisons. While the three signals F1, F2 and F3 tend to be the preferred signals used for recursion, others of the signals illustrated with reference to FIGS. 3, 5 and 6 may also be utilized in the arbitration and feedback process of the FIG. 7 apparatus.

FIG. 8A shows an example of alternate circuitry which may be implemented for the multiplexer 108 and control circuit 110 of FIG. 7. In FIG. 8A the three recursion signals F1, F2 and F3 from arithmetic circuits 104, 112 and 116 are coupled to respective scaling circuits 121-123. The scaled output signals from the scaling circuits 121-123 are coupled to the summing circuit 130 which develops the recursion signal to be applied to the recursion circuitry 20".

Signals F1, F2 and F3 are mutliplied by the factors $\alpha 1$, $\alpha 2$ and $\alpha 3$ respectively in scaling circuits 121-123. The recursion signal, RS, developed by summing circuit 130 is given by $$RS = \alpha 1 F1 + \alpha 2 F2 + \alpha 3 F3 \tag{8}$$

where $$\alpha 1 + \alpha 2 + \alpha 3 = 1 \text{ or } 0. \tag{9}$$

Typically, two of the three scale factors will be zero and the third will be one. However, there are instances when it may be desirable to force all three scale factors to zero, and instances where at least two of the signals F1-F3 are proportioned to form the recursion signal.

In FIG. 8A, the scale factors $\alpha 1$-$\alpha 3$ are generated as follows. The signals F1-F3 and signal W are applied to the differencing circuit 124 which produces three output signals corresponding to the absolute values of (W−F1), (W−F2) and (W−F3). These three signals are coupled to a second differencing circuit 126. Differencing circuit 126 develops three output signals corresponding to the polarity of the difference between a predetermined value, TH, and each of the signals $|W-F1|$, $|W-F2|$ and $|W-F3|$ applied to its input. The convention used is that if the input signal exceeds the predetermined value TH, the polarity indication is a logic 1, otherwise it is a logic zero. The polarity or sign signals are coupled to the input terminals of a decoder 128 which produces the scale factors $\alpha 1$-$\alpha 3$.

Decoder 128 may be a read only memory (ROM) programmed with respective scale factors corresponding to all possible combinations of the polarity input signals. One exemplary scale factor-input signal correspondence is illustrated in the table of FIG. 8B. The columns sgn F1, sgn F2 and sgn F3 represent the three polarity signals. The zeroes in these columns indicate that the difference between the respective signals W and Fi are acceptably small for the particular signal Fi to be coupled to the feedback input of circuit 20". If both signals F2 and F3 are acceptable, portions of both are utilized by programming $\alpha 1$, $\alpha 2$ and $\alpha 3$ to be 0, ¼ and ¾ respectively (rows 1 and 5 in FIG. 8B). In all other instances, only one of the three signals F1-F3 is utilized except when all of the signals F1-F3 are unacceptable (bottom row). Note that if signal F1 and one of the other signals F2 and F3 are concurrently acceptable, i.e. sgn (Fi)=0, the other signals F2 and F3 are selected over signal F1.

Normally, recursive filtering tends to reduce the bandwidth of signals representing edges of moving objects in the reproduced scene and introduces phantom images. To reduce there undesirable features, the scaling/combining circuitry is arranged to be motion adaptive. The motion adaptive circuitry changes the scaling factors K for pixels containing moving edges so that a lesser percentage of delayed signal is combined with the current or incoming signal. This in turn tends to substantially reduce the noise reduction function of the system in the areas containing moving edges. Thus, the areas of the reproduced images adjacent to the edges of moving objects tend to be noisier than the non-moving parts of the reproduced scene.

The recursive filters described herein tend to reduce the number of occurrences that the motion adaptive scaling/combining means is activated to reduce the percentage of the delayed signal that is combined with incoming signal. This is so because the comparator chooses the delayed signal which is most like the incoming signal. The overall effect is that the reproduced images have fewer artifacts and less noise in areas of moving edges.

The circuitry illustrated has been selected to most lucidly describe the invention. It should be appreciated by those skilled in the art of circuitry design, however, that it may be necessary to interpose e.g. compensating delays at various points in the circuit, and that persons skilled in the art will readily be able to include such delays.

In the claims, the term "image period" is defined as the time interval of one field of video information or one frame of video information. A delay of "substantially one image period" is intended to include a range of delay intervals from an image period plus approximately one-half of one horizontal line period to an image period less approximately one-half of one horizontal line period for field recursive filter apparatus, and a range of delay intervals from an image period plus approximately one horizontal line period to an image period less approximatly one horizontal line period for frame recursive filter apparatus. A sample period corresponds to one-quarter of one cycle of the color subcarrier frequency or integral cycles plus one-quarter cycle of the color subcarrier frequency.

What is claimed is:

1. Apparatus for recursively filtering composite video signal comprising:
   an input terminal for applying composite video signal;
   scaling/combining means having a first input terminal coupled to said input terminal, having a second input terminal, and having an output terminal at which recursively filtered signal is available;
   delay means, having an input terminal coupled to the output terminal of said scaling/combining means, and having an output terminal, said delay means for delaying signal applied thereto by substantially one image period;
   means, including means for providing a plurality of relatively delayed signals, said relatively delayed signals being delayed with respect to said composite video signal by substantially but not exactly one image period, having a first input terminal coupled to the output terminal of said delay means, a second input terminal coupled to said input terminal for applying composite video signal, and an output terminal coupled to the second input terminal of said scaling/combining means, and further including means for comparing said composite video signal with said plurality of relatively delayed signals, and selectively coupling the relatively delayed signal most similar to said composite signal to said scaling/ combining means.

2. The apparatus set forth in claim 1 wherein the means including means for providing a plurality of relatively delayed signals comprises:
   further delay means coupled to the output terminal of said delay means, for delaying signal applied thereto by two horizontal line periods, to provide a further delayed signal; and
   said means for comparing and selectively coupling, couples one of delayed signal from said delay means or the further delayed signal from said further delay means which is most similar to said composite video signal to said scaling/combining means, wherein the total delay in the signal paths of said delayed signal and said further delayed signal, between the first and second input terminals of said scaling/combining means, is exactly one image period less one horizontal line period and one image period plus one horizontal line period respectively.

3. The apparatus set forth in claim 2 wherein said further delay means has tapped outputs for providing tapped samples delayed by one horizontal line period less two sample periods and one horizontal line period plus two sample periods with respect to signal applied thereto and wherein said means for comparing and selectively coupling, couples the one of said delayed, further delayed and tapped signals which is most similar to said composite video signal, to the second input terminal of said scaling/combining means, and wherein the total delay in the signal paths of said tapped signals between the first and second input terminals of said scaling/combining means is exactly one image period plus and minus two sample periods respectively.

4. The apparatus set forth in claim 1 wherein the means including means for providing a plurality of relatively delayed signals comprises:
   further delay means having an input coupled to the output terminal of said delay means, for providing further delayed signals at respective output terminals delayed by one horizontal line period less two sample periods and one horizontal line period plus two sample periods relative to signal applied to said input of said further delay means; and
   means coupled to said further delay means for producing a signal corresponding to the average of said further delayed signals.

5. The apparatus set forth in claim 1 wherein the means including means for providing a plurality of relatively delayed signals comprises:
   further delay means having an input coupled to the output terminal of said delay means for providing at respective output terminals first, second and third signals delayed by one horizontal line period less one sample period, one horizontal line period, and one horizontal line period plus one smaple period respectively relative to signals applied to the input of said further delay means;
   means for additively combining said first and third delayed signals with the negative of the second delayed signal to provide a further delayed signal; and
   the means for comparing and selectively coupling, couples one of said delayed signal and said further delayed signal which is most similar to said composite video signal to said scaling/combining means wherein the total delay in the path of the delayed signal selectively applied to said scaling/combining means, between the first and second input terminals of said scaling/combining means, is one field interval less one-half one horizontal line period.

6. The apparatus set forth in claim 5 wherein said delay means output terminal provides signal delayed by approximately one field period less one and one-half horizontal line periods and includes a second output terminal for providing a fourth signal delayed by approximately one frame period less one horizontal line period and wherein said means including means for providing a plurality of relatively delayed signals includes:

means coupled to the second output terminal for delaying signal by two horizontal line periods relative to signal applied thereto to provide a fifth signal; and said means for comparing and selectively coupling, couples one of said delayed, further delayed, fourth and fifth signals which is most similar to said composite video signal to said scaling/combining means and wherein the total delay in the paths of said fourth and fifth signals, between the first and second input terminals of said scaling/combining means, is one frame period less one horizontal line period and one frame period plus one horizontal line period.

7. A recursive filter for processing composite video signals including scaling/combining circuitry for combining incoming composite video signal and delayed signal in predetermined proportions, and delay means coupled to an output of said scaling/combining means for providing a first signal delayed by one frame interval less one horizontal line period and a second signal delayed by one frame interval plus one horizontal line period relative to said incoming composite video signal respectively, means for comparing said first and second signals to said incoming composite video signal and selectively coupling as said delayed signal the one of the first and second signals most similar to said incoming composite video signal as said delayed signal, to said scaling combining means.

8. A recursive filter for processing composite video signal including scaling/combining means for combining incoming composite video signal and delayed signal in predetermined proportions, and delay means coupled to an output of said scaling/combining means for providing a first signal delayed by one field period less one-half horizontal line period and a second signal developed from signal delayed by one field period plus one-half horizontal line period relative to said incoming composite video signal respectively, means for comparing said first and second signals to said incoming composite video signal and selectively coupling as said delayed signal the one of the first and second signals most similar to said incoming composite video signal, to said scaling combining means.

9. The recursive filter set forth in claim 8 wherein said delay means includes means for providing third, fourth and fifth successively delayed signals, the fourth signal being delayed relative to the third signal by one-quarter of a color subcarrier cycle and the fifth signal being delayed relative to the third signal by one-half of said color subcarrier cycle, and means for summing the fifth and third signals and subtracting the fourth signal from the sum of said fifth and third signal to produce said second signal and wherein the contribution of said foruth signal to said second signal selectively applied to said scaling/combining means is delayed relative to said incoming composite video signal by exactly one field period plus one-half one horizontal line period.

10. A recursive filter for processing composite video signal comprising:

a terminal for applying said composite video signal;

scaling/combining means having first and second input terminals for combining signals applied to said first and second input terminals in predetermined proportions, and having an output terminal;

means for coupling said first input terminal to said terminal for applying said composite video signal;

means, coupled to the output terminal of said scaling/combining means, for providing a plurality of signals delayed by substantially one image period relative to said composite video signal applied to said first input terminal;

means, coupled to said means for providing a plurality of delayed signals, for producing at least two signals having a like chrominance phase as a chrominance component of said composite video signal applied to said first input terminal of the scaling/combining means, wherein at least one of said two signals is formed by combining ones of said plurality of delayed signals; and means coupled to said means for producing at least two signals for selectively combining one of said at least two signals having an amplitude most similar to the amplitude of composite video signal applied to said first input terminal, to the second input terminal of said scaling/combining means.

11. The recursive filter set forth in claim 10 wherein the means for producing at least two signals, forms combined signals from ones of said plurality of delayed signals representing picture points that are substantially symmetrically vertically disposed with respect to picture points represented by the composite video signal applied to said first input terminal.

12. The recursive filter set forth in claim 11 wherein said plurality of delayed signals includes three signals, delayed by substantially 263 horizontal line intervals, a first, second and third signal of which are separated by 90 degree intervals with respect to a color subcarrier of said chrominance component, and including a fourth signal delayed by substantially 262 horizontal line intervals and representing a picture point vertically aligned with a picture point represented by said second signal; and said means for producing at least two signals additively combines said first, third and fourth signals with the negative of said second signal to generate one of said at least two signals.

13. The recursive filter set forth in claim 11 wherein said plurality of delayed signals includes three signals delayed by substantially one frame interval, said three signals being separated in time by 90 degree intervals of a color subcarrier of said chrominance component and a second of said three signals representing a picture point corresponding to a picture point represented by the composite video signal applied to said first input terminals and said second signal being disposed, in time, between a first and third of said three signals; and said means for producing at least two signals additively combines the first and third signals with the negative of the second signal to generate one of at least two signals.

14. The recursive filter set forth in claim 10 wherein ones of said at least two signals are respectively derived from signals delayed by substantially one field interval and one frame interval.

15. The recursive filter set forth in claim 10 further including:
    means, coupled to said terminal for applying composite video signal, for providing a plurality of composite video signals all of which represent picture points from the same field as the picture point represented by the composite video signal applied to said first input terminal ones of which occur advanced in time with respect to the composite video signal applied to said first input terminal and ones of which are delayed in time with respect to the composite video signal applied to said first input terminal;
    means, coupled to said means for providing said plurality of composite video signals, for producing a combined signal having a chrominance component of like phase as a chrominance component of the composite video signal applied to said first input terminal;
    means for coupling said combined signal to said means for selectively coupling and wherein said means for selectively coupling couples one of said at least two signals and said combined signal to the second input terminal of said scaling/combining means.

16. A recursive filter for processing sampled data composite video signal, including scaling/combining circuitry for combining incoming sampled data composite video signal and delayed sampled data composite video signal in predetermined proportions, and delay means coupled to an output port of said scaling/combining means for providing said delayed sampled data composite video signal, said delay means including means for providing a plurality of signals each of which is delayed by substantially at least one image period with respect to said incoming sampled data composite video signal and each of which contains a chrominance component substantially in phase with said incoming sampled data composite video signal, said delay means further including means for arbitrating between said plurality of signals and selectively coupling one of said plurality of signals as said delayed sampled data composite video signal, to said scaling/combining means.

17. The recursive filter set forth in claim 16 wherein said means for providing a plurality of signals includes means for providing samples representing picture points which are disposed about a picture point corresponding to a picture point currently represented by the incoming sampled data composite video signal; and
    means for combining ones of said samples for producing signals having a chrominance component in phase with the chrominance component of the incoming sampled data composite video signal.

18. The recursive filter set forth in claim 16 wherein said plurality of signals includes signals derived from signals delayed by substantially one field interval and signals delayed by substantially one frame interval relative to said incoming sampled data composite video signal.

19. A recursive filter for processing composite video signal including a chrominance component, comprising:
    a source of incoming composite video signal;
    scaling/combining means, having a first input terminal coupled to said source and having a second input terminal, combining signals applied to said first and second input terminals in predetermined proportions;
    delay means, coupled to said scaling/combining means, for providing a plurality of signals delayed by at least substantially one image period, said plurality of signals representing respective picture points disposed about at least one picture point corresponding to a picture point represented by said incoming composite video signal;
    means, coupled to said delay means, for providing a further plurality of signals each of which has a chrominance component substantially in phase with the chrominance component of said incoming composite video signal;
    means coupled to said means for providing a further plurality of signals for determining the difference in amplitudes between each of said further plurality of signals and said incoming composite video signal and for selectively coupling ones of said further plurality of signals to said second input terminal of said scaling/combining means as a function of the respective difference in amplitudes between each of said further plurality of signals and said incoming composite video signal.

* * * * *

UNITED STATES PATENT AND TRADEMARK OFFICE
CERTIFICATE OF CORRECTION

PATENT NO. : 4,737,850
DATED : April 12, 1988
INVENTOR(S) : Chung Hsin Lu et al.

It is certified that error appears in the above-identified patent and that said Letters Patent is hereby corrected as shown below:

Column 2 line 41 should read "M+1" instead of "M-1"

Column 4 line 44 should read "This" instead of "this"

Column 4 line 54 should read "$S_2$ respectively" instead of "$S_2$respectively"

Column 9 equation 6 should read "F2=[(Y-I)+(Y-Q)+(Y+Q)-(Y+I)]/2= (Y-I)

Column 9 line 20 should read "these" instead of "there"

Column 12 line 55 should read "sample" instead of "smaple"

Column 14 line 1 should read "fourth" instead of "foruth"

Signed and Sealed this

Eighth Day of November, 1988

*Attest:*

DONALD J. QUIGG

*Attesting Officer*     *Commissioner of Patents and Trademarks*